Jan. 30, 1940.　　F. T. GROTHOUSE　　2,188,784
SHAFT SEAL
Filed Feb. 3, 1939
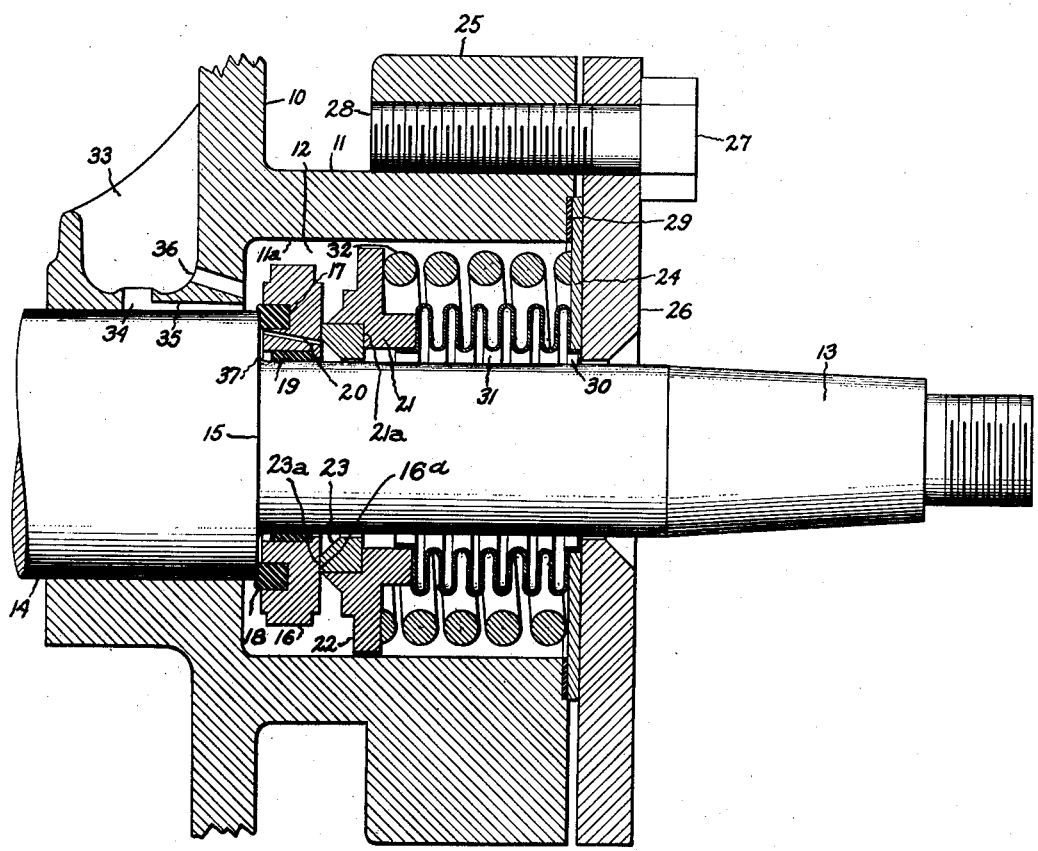
Inventor:
Frank T. Grothouse,
by   Harry E. Dunham
His Attorney.

Patented Jan. 30, 1940

2,188,784

UNITED STATES PATENT OFFICE

2,188,784

SHAFT SEAL

Frank T. Grothouse, Fort Wayne, Ind., assignor to General Electric Company, a corporation of New York Application February 3, 1939, Serial No. 254,432

3 Claims. (Cl. 286—11)

My invention relates to shaft seals and more particularly to rotary shaft seals for refrigerant compressors.

In shaft seals for refrigerator compressors which are provided with a spring pressed sealing ring working against the face of a shoulder on the compressor shaft, difficulties have been experienced after long periods of service because of wear on the shoulder of the compressor shaft. When the shoulder on the shaft becomes scored or damaged or for any other reason unsuitable for further service, it becomes necessary to dismantle the compressor completely and regrind the shaft shoulder to properly recondition the sealing surface and in many cases it may even be necessary to put in a new shaft which also requires complete disassembly of the compressor mechanism. Furthermore, in many instances the remaining parts of the compressor are in a sufficiently good condition so that replacement is not necessary; and it is, therefore, uneconomical to dismantle the entire compressor in order to replace a worn surface on the compressor shaft shoulder. In order to overcome these difficulties, removable collars have been provided having sealing surfaces formed thereon. These collars comprise replaceable shaft shoulders and make it possible to recondition the seal without dismantling the compressor. Under some conditions of operation, it has been found that there is a tendency for the replaceable shaft shoulder to be forced away from its position in engagement with the shoulder on the shaft; such loosening of the shaft shoulder may, of course, result in leakage through the seal.

Accordingly, it is an object of my invention to provide an improved seal which may be replaced readily when worn without requiring a complete dismantling of the compressor and which will operate satisfactorily even under unfavorable conditions which may exist, for example, in large compressors or compressors of any size in which relatively high crankcase pressure may be encountered.

Another object of my invention is to provide an improved shaft seal of the type having a replaceable sealing member arranged on the shaft which will operate satisfactorily under a wide range of conditions and in which the replaceable sealing member does not tend to become unseated because of changes in pressures existing around the seal.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing, the single figure of which is a fragmentary sectional view of a portion of a refrigerant compressor provided with a shaft sealing arrangement embodying my invention.

Referring now to the drawing, I have shown a portion of a refrigerant compressor casing 10 provided with a boss 11 which is counterbored at 11a to define a chamber 12 therein. A drive shaft 13 is journaled in a bearing 14 in the compressor casing which communicates between the interior of the compressor casing and the chamber 12, the drive shaft being coaxial with the counterbore 11a. The shaft 13 is of reduced diameter near its outer end and is provided with a shoulder 15 slightly beyond the outer face of the bearing 14 and within the chamber 12. The outer end of the shaft 13 of reduced diameter extends through the chamber 12 outside the compressor casing and is adapted to be connected to a suitable source of power such, for example, as an electric motor. The inner end of the shaft 13 extends into the interior of the compressor casing and drives the compressor mechanism housed therein.

During operation of the compressor, the pressure within the compressor casing is normally higher than atmospheric pressure, gaseous refrigerant tends to leak from the interior of the compressor casing 10 along the drive shaft 13 into the chamber 12 and out into the atmosphere.

Accordingly, I have provided a sealing arrangement for preventing the escape of refrigerant and other fluids from the interior of the casing 10, preferably comprising a replaceable shoulder 16 mounted on the drive shaft 13 in abutting relation to the shoulder 15 thereon. The replaceable shaft shoulder 16 comprises a ring substantially U-shaped in cross section providing a relatively narrow annular recess 17. Annular ring 18 of resilient material is positioned in the recess 17 provided in the replaceable shaft shoulder and abuts against the shaft shoulder 15 forming a seal between shoulder 15 and replaceable shaft shoulder 16. The sealing ring 18 contacting shaft shoulder 15 is relatively narrow in order to establish the sealing diameter within definite narrow limits for purposes which will be hereinafter set forth in detail. The replaceable shaft shoulder 16 is also provided with a polished transverse outer sealing surface 16a. A resilient driving ring 19 is pressed between shaft 13 and replaceable shoulder 16 in a fixed relation to the shaft and to drive it therewith. The replaceable shoulder 16 and shaft shoulder 15 are spaced apart and the rings 18 and 19 cooperate with the shaft and the replaceable shoulder to form a small annular chamber 37. The chamber 37 is maintained at atmospheric pressure by a duct or vent 20 providing communication between the chamber and the outside of the seal. Should the sealing ring 18 be defective when installed and permit the passage of oil or vapor into the chamber 37, the leak will quickly become apparent due to leakage through the vent 20 and along the shaft 13, and the defective seal may be discovered quickly and replaced. It is readily apparent that the resilient ring 19 is provided solely to hold the replaceable shoulder 16 in position on the shaft while the ring 18 is provided to effect a seal between the replaceable shoulder and the shaft shoulder 15. The sealing ring 18 and the driving ring 19 preferably comprise a material having similar physical characteristics to those of rubber but being less affected by saturation with lubricating oil. One such material suitable for this purpose, available on the market under the trade name Neoprene, undergoes a change of less than 10 per cent by volume when saturated with lubricating oil and is well suited for use in seals of the type described herein. Ordinary rubber would increase in volume from 100 to 200 per cent when saturated with lubricating oil and obviously is unsatisfactory for sealing purposes when in contact with oil.

An annular supporting collar 21 having a peripheral flange 22 is provided in chamber 12 and surrounds the shaft 13 in spaced relationship thereto. The supporting collar 21 is provided with an annular recess at 21a in the face thereof adjacent the replaceable shoulder 16 and open to the drive shaft 13. An annular nosepiece 23 is mounted in the recess 21a of the supporting collar 21 in such a manner that no leakage can occur between nosepiece 23 and supporting collar 21. The nosepiece 23 is preferably made of a lead bronze alloy and is welded to the supporting collar 21. The nosepiece 23 is provided with a polished bearing and sealing face 23a which engages the sealing surface 16a of replaceable shoulder 16 and carries the thrust between the supporting collar 21 and the replaceable shaft shoulder 16.

In the open end of chamber 12 opposite the bearing 14 there is provided an annular washer 24 removably secured in sealed relationship with annular flange 25 provided about the outer end of the boss 11. Annular washer 24 is secured in place by means of an annular cover member 26 fastened to the flange 25 by cap screws 27 having threaded ends 28. A suitable gasket 29 is interposed between the flange 25 and the washer 24 in order to tightly seal the washer 24 to the boss 11. The inner diameter of the washer 24 is slightly larger than the reduced diameter of the shaft 13 and hence there is a small space 30 between the washer and the shaft. An imperforate resilient metallic bellows 31 extends between the supporting ring 21 and the washer 24. The opposite ends of the bellows 31 are soldered or otherwise hermetically sealed to the adjacent portions of the supporting collar 21 and the washer 24 respectively. The bellows 31 thus forms a seal between the supporting collar 21 and washer 24, and hence the supporting collar 21 and the nosepiece 23 comprise a stationary element of the sealing arrangement.

A helical compression spring 32 surrounds the bellows 31 and extends between the peripheral flange 22 of the supporting collar 21 and the intermediate portion of the washer 24 inside the chamber 12. This helical spring firmly presses the nosepiece 23 in bearing and sealing engagement with the replaceable shaft shoulder 16. When the parts are assembled as shown in the drawing, the shaft 13 and the replaceable shaft shoulder 16 are rotatable while the remaining parts of the shaft seal are stationary.

In the operation of the compressor the lubricant contained within the compressor casing 10 is splashed upwardly so that some of it enters the pocket 33 from which a portion of it flows through the passage 34 to the contacting surfaces of the drive shaft 13 and the bearing 14 to lubricate the same. Another portion of this lubricant also flows along the drive shaft 13 through a longitudinal groove 35 formed in the bearing 14 and enters the interior of chamber 12. Lubricant also flows from the pocket 33 through a passage 36 into the chamber 12. The lubricant thus entering the interior of the chamber 12 lubricates the sealing surface 16a of the removable collar 16 and the bearing surface 23a of the nose piece 23. It will be observed that a considerable amount of lubricant will be trapped and retained in the chamber 12 providing a seal of the flooded type. The lubricant contained in the chamber 12 will come in contact with the resilient sealing ring 18. It is evident, therefore, that the resilient sealing ring should be constructed of some suitable material such as Neoprene which is not materially affected by contact with lubricating oil.

The separate sealing ring 18 and driving ring 19 make possible the satisfactory operation of compressors of large sizes where the areas exposed to crank case pressure are great, or of compressors of any size where the crank case pressures are high. Since resilient member 18 serves merely as a sealing ring and need not function as a means for driving the replaceable shaft shoulder with the compressor shaft, it may be made relatively narrow so as to establish the effective sealing diameter within definite narrow limits. The effective sealing diameter of resilient member 18 with respect to shaft shoulder 15 is definitely greater than the diameter of the seal between the sealing faces 23a and 16a so that as the crank case pressure increases greater force is exerted tending to push the replaceable shoulder 16 against shaft shoulder 15. Therefore, my invention is applicable to high pressure compressors or to compressors of large sizes where it becomes desirable to assure quite definitely that the effective sealing diameter of the replaceable shaft shoulder with respect to the shaft shoulder 15 is larger than the effective sealing diameter between sealing faces 23a and 16a. If the above relation exists, the replaceable shaft shoulder 16 is pressed against the shaft shoulder 15 by the crank case pressure exerted about the seal, it being evident that the crank case pressure acts against a greater area in a direction tending to force the replaceable shoulder against the shaft shoulder than in the opposite direction. The presence of the chamber 37 vented to atmosphere cuts down materially the areas of the replaceable shaft shoulder 16 exposed to crank case pressure which would tend to force it away from shoulder 15. Therefore, regardless of how high the crank case pressure may be, the replaceable shaft shoulder 16 will not be forced away from the shoulder 15 but instead will be pressed against the shoulder 15 with greater force as the compressor crank case pressure increases. It is, therefore, not necessary to make the spring 32 strong enough to provide increased pressure to balance increased crank case pressures.

It will thus be seen that I have provided a simple and effective arrangement for sealing the shaft aperture of a compressor casing comprising an improved type of replaceable shaft shoulder which will operate efficiently in high pressure compressors, or in compressors of large sizes where the areas exposed to crank case pressures are large, and that there will be no tendency for the replaceable shaft shoulder to be forced out of engagement with the shaft shoulder.

While I have shown a particular embodiment of my invention in connection with a compressor for a refrigerating machine I do not desire my invention to be limited to the construction shown and described, and I intend in the appended claims to cover all modifications within the spirit and scope of my invention.

What I claim as new and desire to secure in Letters Patent of the United States is:

1. A shaft seal comprising a casing provided with a shaft aperture, a rotatable shaft extending through said aperture and provided with a transverse annular shoulder, a removable collar surrounding said shaft adjacent said shoulder, means for securing said collar to said shaft for rotation therewith, a ring of resilient material surrounding and spaced from said shaft and arranged between said shoulder and said removable collar for providing between said collar and said shoulder a seal having a predetermined effective sealing diameter, said collar having an annular sealing surface on the side thereof remote from said shoulder, a second collar arranged about and spaced from said shaft and having an annular nosepiece provided with a sealing surface arranged to engage said sealing surface on said removable collar, means for sealing said second collar with respect to said casing, and means for urging said second collar axially of said shaft toward said removable collar to maintain said sealing surfaces in engagement, the effective sealing diameter of said nosepiece being less than the effective sealing diameter of said resilient ring.

2. A shaft seal comprising a casing provided with a shaft aperture, a rotatable shaft extending through said aperture and provided with a transverse annular shoulder, a removable collar surrounding said shaft adjacent said shoulder, means including a ring of resilient material for securing said collar to said shaft for rotation therewith, a ring of resilient material surrounding and spaced from said shaft and arranged between said shoulder and said removable collar for providing between said collar and said shoulder a seal having a predetermined effective sealing diameter, said ring cooperating with said shoulder and said removable collar to provide an annular chamber surrounding said shaft, means for providing communication between said chamber and the atmosphere outside said casing, said collar having an annular sealing surface on the side thereof remote from said shoulder, a second collar arranged about and spaced from said shaft and having an annular nosepiece provided with a sealing surface arranged to engage said sealing surface on said removable collar, means for sealing said second collar with respect to said casing, and means for urging said second collar axially of said shaft toward said removable collar to maintain said sealing surfaces in engagement, the effective sealing diameter of said nosepiece being less than the effective sealing diameter of said first-mentioned resilient ring.

3. A shaft seal comprising a casing provided with a shaft aperture, a rotatable shaft extending through said aperture and provided with a transverse annular shoulder, a removable collar surrounding said shaft adjacent said shoulder and having an annular recess therein on the side adjacent said shoulder, means including a ring of resilient material arranged in said recess for securing said collar to said shaft for rotation therewith, a ring of resilient material surrounding and spaced from said shaft and arranged between said shoulder and said removable collar for providing between said collar and said shoulder a seal having a predetermined effective sealing diameter, said ring cooperating with said shoulder and said removable collar to provide an annular chamber surrounding said shaft, means including a vent in said removable collar for providing communication between said chamber and the atmosphere outside said casing, said collar having an annular sealing surface on the side thereof remote from said shoulder, a second collar arranged about and spaced from said shaft and having an annular nosepiece provided with a sealing surface arranged to engage said sealing surface on said removable collar, means for sealing said second collar with respect to said casing, and means for urging said second collar axially of said shaft toward said removable collar to maintain said sealing surfaces in engagement, the effective sealing diameter of said nosepiece being less than the effective sealing diameter of said first-mentioned resilient ring.

FRANK T. GROTHOUSE.